March 7, 1939.   L. O. E. ROESSEL   2,150,106
CAMERA
Filed April 30, 1938
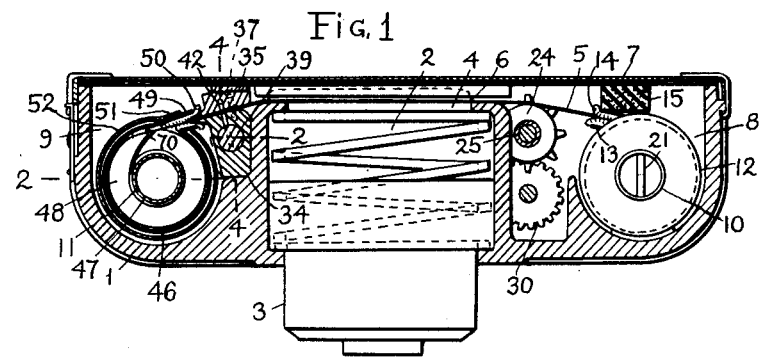
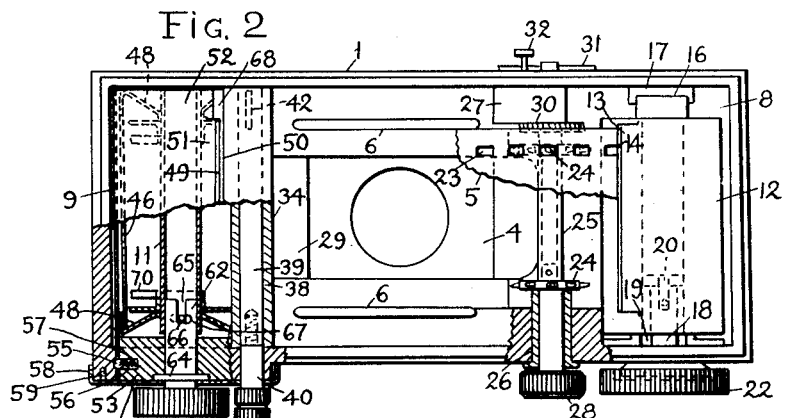
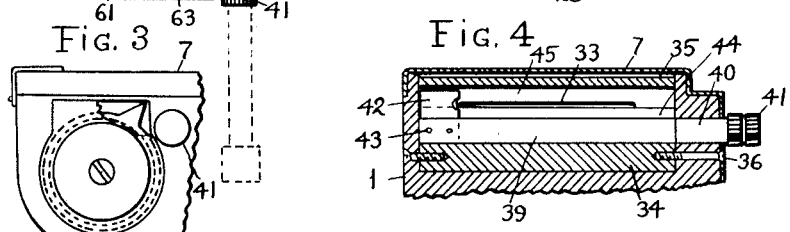
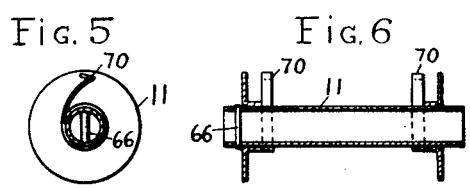
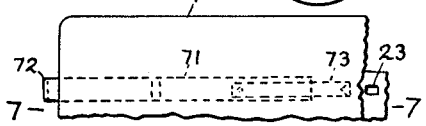
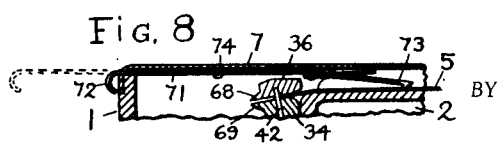
Louis Otto E. Roessel
INVENTOR.
BY John P. Wilson
ATTORNEY.

Patented Mar. 7, 1939

2,150,106

UNITED STATES PATENT OFFICE 2,150,106

CAMERA

Louis Otto E. Roessel, Chappaqua, N. Y., assignor of one-half to Universal Development Corporation, New York, N. Y.

Application April 30, 1938, Serial No. 205,163

11 Claims. (Cl. 95—31)

My invention relates to cameras and has particular reference to photographic cameras adapted to be used with rolls of film.

In cameras using rolls of films, it is usually necessary to have one complete roll of films exposed before opening the camera for the removal of the exposed film. With cameras using miniature films and having a relatively large number of spaces for pictures on one roll, usually 36, it is often inconvenient to wait until the whole roll is used up, when only a few pictures have been taken and it is desired to have them developed. In ordinary cameras there is no provision for cutting off a portion of the film with but a few pictures, without affecting the rest of the unexposed film.

My invention has, therefore, for its object to provide an arrangement whereby a portion of the exposed film can be cut off, and removed without affecting the unexposed portion of the film. For this purpose, I provide a movable knife supported in a guiding member in the camera and adapted to be manually moved for cutting the film in two.

Another object of my invention is to provide means for the removal of the cut off portion of the film in daylight. For this purpose, I provide the receiving end of the camera with a removable cartridge for the receiving spool, the cartridge being light-proof and having a slot for the film with velvet lining so as to exclude light from the film when the latter is wound on the spool and the cartridge with the spool is removed from the camera.

Another object of my invention is to provide means to move the end of the unexposed film, after the exposed portion has been cut off, into engagement with the spool. For this purpose, I provide a handle on the outside of the camera for rotating toothed wheels engaging perforations in the film. As a supplementary means or a modification, I provide a movable hook tapered off in the direction of movement of the film, so that the hook does not interfere with the film when the latter is moved by turning the spool, but engages the film when the hook is moved by hand. This device operates preferably with a film having holes along its edges. The hook has a handle moving in a slot in the camera or its cover for moving the hook, the slot being of sufficient length to permit the film to be moved until it is in position to be engaged by film catching means on the spool.

Still another object of my invention is to provide means to catch the end of the film and to wind it on the receiving spool. For this purpose, the spool has resilient strips extending tangentially from the spool and having hooks on the ends adapted to fit into the holes in the spool. By turning the spool by hand, the hooks are made to move over the film until they engage the holes in the film.

My invention is more fully described in the accompanying specification and drawing in which—

Fig. 1 is a sectional elevational view of my camera.

Fig. 2 is a top plan view partly in section and with the cover removed.

Fig. 3 is a fractional end view.

Fig. 4 is a fractional sectional view taken on the line 4—4 of Fig. 1.

Fig. 5 is an end view of a receiving spool.

Fig. 6 is a sectional elevational view of the receiving spool.

Fig. 7 is a fractional top view showing the arrangement for pulling the film.

Fig. 8 is a fractional sectional view taken on the line 8—8 of Fig. 7.

My camera consists of a casing 1 made of metal, Bakelite or a similar material or composition. It has a tubular chamber 2 for a focusing mount 3 of an ordinary construction. The chamber has a rectangular opening 4 at the rear for projecting an image on a film 5 which is guided over the opening between guide ribs 6. A cover 7 is removably fitted on the open rear side of the casing. The casing has rounded compartments 8 and 9 at the ends, a roll of film on a receiving spool 10 at one end, and for the exposed film which is gathered on a delivering spool 11 at the other end. The spool 10 is placed in a light-proof cartridge 12 of an ordinary construction with lips 13 covered inside by strips of black velvet 14. The cartridge is held in place by a piece 15 of sponge rubber or similar elastic material and rests by the extension 16 at one end in a seat 17 and by a shaft 18 at the other end in a seat 19. The shaft 18 has a slot 20 engaging a pin 21 in the spool and is provided with a thumbhead 22 for rotating the spool and for pulling out the shaft 18 when it is desired to replace the cartridge with the roll of film.

My camera is especially designed for a film having side perforations 23 engaging a pair of toothed wheels 24 on a shaft 25. The latter is journaled in bearings 26 and 27 and has a thumbhead 28. By turning the shaft, the film may be advanced toward the other end of the camera in a slot 29 between the guides 6, the teeth of the wheels 24 being spaced in accordance with the standard spacing of the side perforations 23. Gears 30 connect the shaft 25 with a counting device of an ordinary type such as a disc 31 and a releasable stop 32 for stopping the rotation when the film has been advanced a distance corresponding to the space for one picture.

The exposed film passes through a slot 33 between a block 34 and a cover piece 35, the block being fitted in a corresponding recess in the casing and held by screws 36. The cover is held on the block by screws 37. The block has a longitudinally drilled hole 38 for a rod 39 having an extension 40 of the same diameter passing through a correspondinng extension hole in the wall of the casing 1 and provided with a thumb head or handle 41. The inner end of the rod 39 has a slot for a knife 42 fastened in the slot by rivets 43. Slots 44 and 45 are provided for the knife in the block 34 and the cover 35. The knife slides in these slots when the rod is pulled out by the handle 41. The cutting edge of the knife is preferably made of a concave shape although, of course, it may be of any suitable shape adapted to cut the film when the rod is being pulled out. The slot 33 retains film in its place against the pressure from the knife.

The film, if not cut by the knife, passes into a removable cartridge 46 with a removable spool 11 inside. The cartridge 46 has flanged end bells 48 removably fitted over the ends of the cartridge and sliding by their inner apertures over the spool 11. The cartridge has lips 49 with velvet strips 50 inside forming a light-proof slot for admitting the film. The lips 49 fit between corresponding lips 51 in a protective shell 52 fitted in the chamber 9. An opening is provided in the side wall of the casing 1 for the removal of the cartridge 46, the opening having a triangular extension for the lips 49. The opening is closed by a removable plug 53 with a lug 54 fitting in the triangular portion of the opening. The plug is resiliently retained in its place by a ball 55 in a hole 56 with a spring 57 back of it, the edges of the hole being swedged so as to prevent the ball from coming out entirely. The ball partly extends beyond the edge of the plug and snaps into a corresponding depression in the wall of the shell when plug is moved into its place in the opening of the casing. A metal cover 58 is fastened to the side of the casing by screws 59 and has a slot 60 covered by a plate 61. A shaft 62 passes through a hole in the plate 61 and has a thumb head 63 at the outer end and a collar 64 on the other side of the plate. The shaft 62 has a slot 65 in the end for a pin 66 in the spool 11. The slot has side grooves 67 so as to engage the pin when it is desired to pull out the spool 11 with the cartridge from its place in the shell 52. The cartridge is guided in its movement by the lips 49 of the shell and also by sharp pointed lips 68 and 69 on the cover 36 and block 35, the latter lips fitting between the velvet strips 50 of the cartridge, thereby also insuring a light-proof connection for guiding the film.

The spool 11 has a pair of resilient hooks 70 adapted to engage the perforations 23 in the end portion of the film when the latter is inserted into the cartridge and the spool turned in a counterclockwise direction looking at the Fig. 1. In order to advance the end of the film into the cartridge after the film has been cut, a film moving device is provided shown in Figs. 7 and 8. It consists of a bar 71 sliding in a slot in the cover 7 and having a handle 72 outside. The inner end of the bar has a spring hook 73 shaped so that the film slides under it when it is moved, the hook being adapted to engage the film perforations when it is moved forward by pulling on the handle 72. The length of travel of the hook is adjusted so as to bring sufficient length of the film into the cartridge to be caught by the hooks 70.

The operation of my camera is as follows:

A roll of film in a cartridge 12 is placed in the camera with the cover 7 removed, and the blank end of the film moved over the wheels 24, between the guides 6, through the slot 33 and through the opening between the lips 50 into the receiving cartridge 46. The thumbhead 63 is then turned counterclockwise until the spring hooks 70 engage the perforations 23 in the end of the film. The film can be conveniently moved by turning the thumbhead 28 of the shaft 25 if the latter is provided. The thumbhead may be dispensed with, however, in which case the film can be moved only by turning the head 63.

When the desired number of exposures have been made, the exposed portion of the film can be cut off. For this purpose, the knife 42 is moved across the film by pulling on the thumbhead 41 thereby moving the rod 39 outward into the position shown in dotted lines in Fig. 2. Upon cutting the film, the knife is returned to its original position. The cut off portion of the film is wound on the spool and the latter removed from the camera. For this purpose, the block 53 is pulled out, turning it to the left so as to engage the pin 66 by the side slots 67. The cartridge with the exposed film is removed from the end of the shaft 62 and a new cartridge with an empty spool inside placed on the end of the shaft 62, the assembly being then inserted back into the camera. All these operations can be performed in daylight, light being excluded from the film by the light-proof cartridge. The remaining portion of the film in the camera is protected from light by the parts 34 and 35. The film is then moved forward so as to bring its end into the cartridge 46. It can be moved by the wheels 24 and counting the number of their revolutions may be required for bringing the end of the film into the cartridge 46 in contact with the spring hooks 70. This can be also accomplished by pulling on the handle 72 of the film moving hook 73. A lug 74 on the bar 71 limits the movement of the hook by coming to rest against the inner wall of the camera.

It is understood that my camera may be further modified without departing from the spirit of my invention as set forth in the appended claims.

I claim as my invention:

1. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from its supporting means, a hook movably supported at the guiding plate, a handle on the hook extending to the outside of the camera, the point of the hook being directed forward thereby permitting the film to move freely under the hook, the hook being adapted to be manually moved and being adapted to engage the film when moved thereby pulling the film through a definite distance for bringing the end of the film into engagement with the receiving spool.

2. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from its supporting means, a hook movably supported at the guiding plate, a handle on the hook extending to the outside of the camera, the camera having a slot for the handle, the point of the hook being directed forward thereby permitting the film to move freely under the hook, the hook being adapted to be manually moved and being adapted to engage the film when moved thereby pulling the film through a definite distance to bring the end of the film into engagement with the receiving spool, and means to prevent passage of light through the slot for the handle.

3. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from its supporting means, a hook movably supported at the guiding plate, a handle on the hook extending to the outside of the camera, the point of the hook being directed forward thereby permitting the film to move freely under the hook, the hook being adapted to be manually moved and being adapted to engage holes at the side of the film when moved thereby pulling the film through a definite distance for bringing the film into engagement with a new receiving spool.

4. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from its supporting means, means to move the remaining film into engagement with a new spool in the spool supporting means, and means on the spool for engaging holes in the edge portions of the film when the spool is rotated.

5. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from its supporting means, means to move the remaining film into engagement with a new spool in the spool supporting means, and resilient members at the ends of the spool with hooks on the ends adapted to engage holes in the edge portions of the film when the spool is manually rotated.

6. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from its supporting means, means to move the remaining film into engagement with a new spool in the spool supporting means, resilient members extending from the spool at its ends, and hooks on the ends of the resilient members adapted to engage holes in the edge portions of the film when the spool is manually rotated, the resilient members being adapted to be pressed against the spool by the subsequent turns of the film on the spool.

7. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from the supporting means, means to move the remaining film into engagement with a new spool in the spool supporting means, resilient members extending tangentially from the spool at its ends, and hooks on the ends of the resilient members adapted to engage holes in the edge portions of the film when the spool is manually rotated, the resilient members being adapted to be pressed against the spool by the subsequent turns of the film on the spool.

8. A camera comprising a casing means to rotatively and removably support a roll of films at one end of the camera, means to guide the film to the other end of the camera, means to rotatively and removably support a spool for receiving the exposed film at the other end of the camera, a block forming a wall across the camera back of the spool having an elongated slot for the film adapted to guide the film into the spool, the block being provided with a second slot transversely to the film guiding slot, a knife slidably supported in the slot, a handle on the knife for moving the knife transversely of the film thereby cutting the film apart, and means to move the remaining film into engagement with a new spool in the spool supporting means.

9. A camera comprising a casing, means to rotatively and removably support a roll of films at one end of the camera, means to guide the film to the other end of the camera, a cartridge, means to removably support the cartridge in the receiving end of the camera, means to rotatively and removably support a spool for the exposed film in the cartridge, the cartridge being provided with a slot in the wall for receiving the film for the spool, means to guide the film into the slot, a knife movably supported in the camera and adapted to be manually operated for cutting the film in two, and means to exclude light from the film back of the knife.

10. A camera comprising a casing, means to rotatively and removably support a roll of films at one end of the camera, means to guide the film to the other end of the camera, a cartridge, means to removably support the cartridge in the receiving end of the camera, a spool for the exposed film, means to rotatively and removably support the spool in the cartridge, the cartridge being provided with a slot in the wall for receiving the film for the spool, means to guide the film into the slot, a knife movably supported in the casing and adapted to be manually operated for cutting the film in two, and hook means in the spool for engaging the end of the film.

11. A camera comprising a casing with an objective lens, means to rotatively and removably support a roll of films at one end of the camera, means to guide the film in front of the lens to the other end of the camera, means to rotatively support a spool for the exposed film at the other end of the camera, a knife, a guiding member for the knife with a slot extending transversely of the film in front of the spool supporting means, means to manually move the knife in the slot thereby cutting the film in two, the spool with the exposed cut-off portion of the film being adapted to be removed from its supporting means, means to move the remaining film into engagement with a new spool in the spool supporting means, and means to control the length of the film moved into the new spool.

LOUIS OTTO E. ROESSEL.

DISCLAIMER 2,150,106.—*Louis Otto E. Roessel*, Chappaqua, N. Y. CAMERA. Patent dated March 7, 1939. Disclaimer filed February 29, 1940, by the inventor; the assignee, *Universal Development Corp.*, consenting.

Hereby enters this disclaimer to claim 10 in said specification.

[*Official Gazette March 26, 1940.*]